United States Patent [19]

Cox deceased et al.

[11] Patent Number: 4,841,124
[45] Date of Patent: Jun. 20, 1989

[54] STRAIN-RESISTANT HEATED HELICOPTER ROTOR BLADE

[75] Inventors: Duncan B. Cox deceased, late of Pittsburgh, Pa., Basil M. Cox, executor; Martin Schuyler, Hastings-on-Hudson, N.Y.

[73] Assignee: Cox & Company, Inc., New York, N.Y.

[21] Appl. No.: 42,859

[22] Filed: Apr. 27, 1987

Related U.S. Application Data

[63] Continuation of Ser. No. 361,805, Mar. 25, 1982, abandoned, which is a continuation-in-part of Ser. No. 174,597, Aug. 1, 1980, abandoned.

[51] Int. Cl.⁴ .............................................. H05B 3/36
[52] U.S. Cl. ................................... 219/201; 219/202; 219/528; 219/549
[58] Field of Search ............... 219/201, 203, 213, 528, 219/548, 549, 345, 535; 338/208; 244/134 R, 134 A, 134 D; 416/226

[56] References Cited

U.S. PATENT DOCUMENTS

| | | | |
|---|---|---|---|
| 787,047 | 4/1905 | Leonard | 338/208 |
| 1,362,351 | 12/1920 | Rankin | 219/549 |
| 2,487,658 | 11/1949 | LaRue | 244/134 D |
| 2,496,279 | 2/1950 | Ely | 219/528 |
| 2,503,457 | 4/1950 | Speir | 244/134 D |
| 2,564,325 | 8/1951 | Coonly | 244/134 D |
| 2,591,757 | 4/1952 | Young | 244/134 D |
| 2,743,890 | 5/1956 | LaRue | 244/134 D |
| 2,757,273 | 7/1956 | Taylor | 219/544 |
| 2,938,992 | 5/1960 | Crump | 338/208 |
| 3,002,718 | 10/1961 | Hackenberger | 244/134 R |
| 3,022,412 | 2/1962 | Waters | 219/549 |
| 3,096,826 | 7/1963 | Amer | 416/226 |
| 3,112,797 | 12/1963 | Haw | 416/226 |
| 3,178,560 | 4/1965 | Mapp | 244/134 D |
| 3,204,084 | 8/1965 | Spencer | 244/134 D |
| 3,232,349 | 2/1966 | Ballauer | 416/226 |
| 3,344,385 | 9/1967 | Bartos | 338/212 |
| 3,472,289 | 10/1969 | Webber | 219/529 |
| 3,496,331 | 2/1970 | Fleury | 219/201 |
| 4,144,445 | 3/1979 | Thweatt | 219/532 |
| 4,410,794 | 10/1983 | Williams | 219/201 |

FOREIGN PATENT DOCUMENTS 2533936 2/1977 Fed. Rep. of Germany.

Primary Examiner—Teresa J. Walberg
Attorney, Agent, or Firm—Mark H. Jay

[57] ABSTRACT

Wire is flat braided into a straight component on a braiding machine, and carrier threads keep the component from deforming as it is drawn off the machine. The carrier threads are removed. The braid component is cut into straight strips with terminals connected to the ends of the strips. The braid component with leads extending therefrom is mounted to or in the surface of a high strain aerodynamic component. The axis of the heater is parallel to the direction of applied stress. The wires lie along directions of reduced strain.

4 Claims, 4 Drawing Sheets

FIG. 1A
FIG. 1B
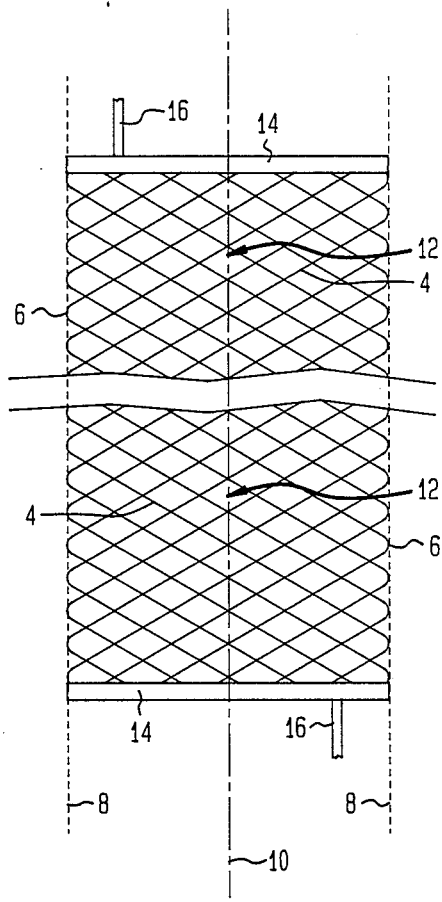
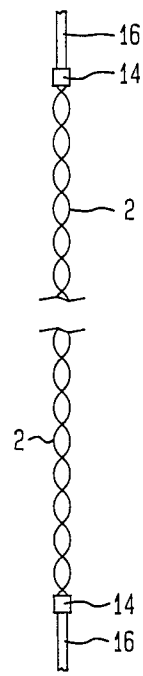

STRAIN-RESISTANT HEATED HELICOPTER ROTOR BLADE

CROSS-REFERENCE TO RELATED APPLICATIONS

This is a continuation of application Ser. No. 361,805, filed Mar. 25, 1982 now abandoned.

That application is a continuation-in-part application of copending Ser. No. 174,597, filed Aug. 1, 1980 now abandoned. The disclosure and drawings of this related application are hereby expressly incorporated herein by reference. as if fully set forth.

The invention pertains to the art of electrical heaters, and more particularly pertains to electrical heaters for use on aerodynamic surfaces.

It has long been known to use electrical heaters as deicers or anti-icers on aircraft, in order to prevent excessive ice accumulation on wing surfaces, engine cowlings and other aerodynamic surfaces. For example, U.S. Pat. No. 3,022,412 discloses an electrical deicer which heats an airfoil.

Fixed structures such as wings and engine cowlings have been, and now are, successfully deiced or anti-iced. This success has fostered the belief that movable structures such as helicopter rotor blades can be deiced or anti-iced merely by adapting existing heaters. However, known heaters have not operated reliably in these latter applications. Such heaters have often failed prematurely. This has especially serious consequences in a helicopter, because once excessive ice accumulates on a helicopter rotor blade, it is likely that the helicopter will crash. For this reason, United States helicopters are not cleared for flight in heavy icing conditions.

When failures of electrical heaters in applications such as helicopter rotor blades have previously been investigated, failure has often been ascribed to production problems or quality control problems rather than to fundamental design defects. Efforts at improving the reliability of heaters for helicopter rotor blades have not met with success, as evidenced by the lack of a blade heater with which a United States military or commercial helicopter can be certified (by application to the proper governmental authorities) for flight in heavy icing conditions.

Accordingly, it is the object of this invention to provide a reliable electrical heater for use with helicopter rotor blades and the like.

The invention proceeds from a realization that there is a substantial theoretical difference between designing an electrical heater for use on a fixed structural element, such as a wing, and a moving one such as a helicopter rotor blade. More particularly, the invention proceeds from a realization that a structure such as a helicopter rotor blade is cyclically strained (i.e., is mechanically deformed repetitively) to a far greater degree than a part such as a wing. Consequently, if an electrical heater which has been designed for use on a wing is installed on a helicopter rotor blade, the electrical heater is likely not to be sufficiently strain-resistant and is likely to fail in fatigue. Briefly, the invention provides an electrical heater which is highly resistant to large cyclical strain of the surface to which it is attached. This is achieved by making a special component that is composed of the resistive elements of the heater. Two major features of the invention are that (1) the dimensions of the component are chosen in relation to the application for the heater, and (2) the resistive elements are oriented at favorable angles relative to the strain which will occur in the materials within which or against which the heater will be installed.

With the heater installed against or inside a blade, the blade carries almost all the centrifugal force and also nearly all of the forces that cause bending, i.e. nearly all the applied forces, while the heater carries only an insignificant amount of the total applied force. The heater is constrained to stretch with the blade and must be able to survive this strain (stretching) regardless of the heater stiffness or of its strength expressed in terms of stress.

According to the method aspect of the invention, wire for use in the electrical heater is flat braided in a conventional braiding machine. The braid is manufactured with at least one warp thread that serves as a carrier thread. This prevents the wire braid from being distorted as it is drawn off the braiding machine. The carrier thread can subsequently be removed from the braid prior to use of the braid in a heater.

BRIEF DESCRIPTION OF THE DRAWINGS

The drawings show a presently preferred but nonetheless only illustrative embodiment of the invention, in which:

FIGS. 1A, 1B, and 1C are, respectively, top, side, and enlarged detail views of a component in accordance with the invention;

THEORETICAL BASIS FOR THE PREFERRED EMBODIMENTS

Figure 2:
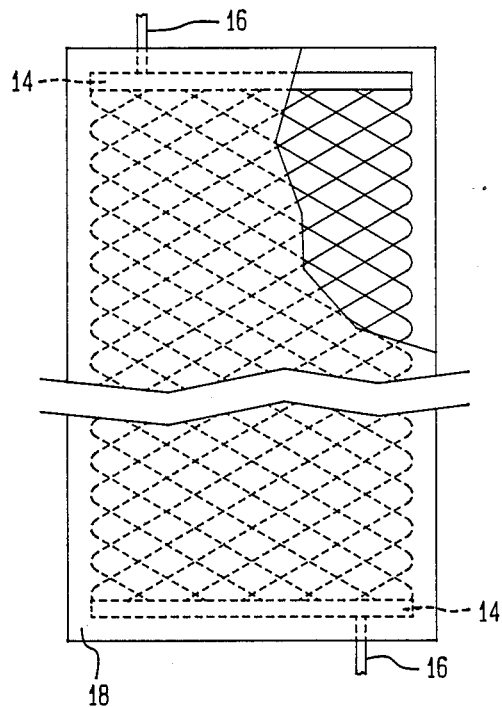
FIG. 2 shows a top view, partially cut away, of an embodiment of the invention which uses a flexible envelope to prevent deformation of the component.

When a stress (i.e. a force) is applied to a body, two components of strain (i.e. two physical deformations) will be developed in the body: one parallel, and the other perpendicular, to the applied stress. For example, if longitudinal stress is applied to a wire, the wire will not only elongate, but will also get thinner. Thus, application of a stress to a body will cause two strain components to arise—a parallel strain component which is parallel to the applied stress and constitutes an elongation of the body, and a perpendicular strain component which is perpendicular to the applied stress and constitutes a contraction of the body. The ratio of the perpendicular component to the parallel component is defined as Poisson's ratio, which is constant for any given homogeneous material but which varies from one material to another.

For any homogeneous body to which a stress is applied, there is a direction within the body and on its surface along which no strain exists. In accordance with one feature of this invention, the known Poisson's ratio of a body to be heated (i.e., a helicopter rotor blade) and the known direction of stress applied to the body are considered in designing and installing a suitable electrical heater for that body.

Helicopter rotor blades are conventionally made of steel, aluminum, titanium, and/or plastic composites in which a plastic is reinforced with fibers such as glass, Kevlar, carbon, or metallic whiskers. Although these structures are not entirely homogeneous and have different Poisson's ratios, they may all be treated for purposes of this invention as being homogeneous and having a Poisson's ratio of approximately 0.3. In a body which has a Poisson's ratio of 0.3, those directions along which no strain exists, despite an applied stress, lie at angles of approximately 60° with respect to the applied stress.

A helicopter rotor blade is exposed to, inter alia, centrifugal force, and bending forces. Centrifugal force causes the blade to elongate (i.e. to exhibit longitudinal strain), and bending forces cause the blade to flex up and down.

Centrifugal force is constant and causes a longitudinal strain on the order of 1500 microinches per inch of rotor blade length. Bending forces, however, are not constant. Normally, a helicopter blade bends up as it moves along one side of the helicopter, and bends down during movement along the other side. The stress from this bending adds a cyclic component of longitudinal strain in the range of ±1500 microinches per inch of rotor blade length. This cyclic component will have a relatively constant frequency in the range of between 200-500 cycles per minute, the approximately constant r.p.m. range of a helicopter rotor. When these effects are combined, there is an overall longitudinal strain on the rotor blade which may vary cyclically between 0 and 3000 microinches per inch or more. Hence, a longitudinally oriented heater for a helicopter rotor blade must resist a cyclically varying longitudinal strain, i.e. a repeated physical contraction and elongation in the longitudinal direction.

Furthermore, if a heater is attached to the rotor blade, the total effective strain (i.e. the distortion from a relaxed state) to which both are exposed is increased as a result of heater operation. A heater may produce a power density of 25 watts per square inch and may produce a temperature gradient of over 100° F. between the heater and the nearby structure. These factors cause the dimensions of the materials used to change and may add the strain equivalent of 800 microinches per inch when the heater is operated. Since the heater is cycled or turned on and off during normal operation, this additional strain is also non-constant. The amount of the effective strain may also vary with ambient temperature.

In summary, a typical helicopter rotor blade is be made of a material with a Poisson's ratio of about 0.3 and its surface may experience cyclical longitudinal strain of 3000 microinches per inch or more. However, its surface will be relatively unchanged in length along directions inclined approximately 60° with respect to its longitudinal axis. This invention makes use of this characteristic.

DETAILED DESCRIPTION OF PREFERRED EMBODIMENTS

In an electric heater, electric power is supplied and heat is generated to melt orprevent formation of ice. The actual manner of such heat generation is determined by the control system to which the heater is connected. It is possible to operate the heater as a deicer, in which case ice is permitted to form and the heater is energized periodically to throw off accumulated ice. Alternatively, it is possible to operate the heater as an anti-icer, in which case ice formation is prevented in the first instance. The manner of operation of the heater forms no part of the invention, but deicing operation is presently preferred because of the savings in power consumption and because of more effective operation.

Figure 1C:
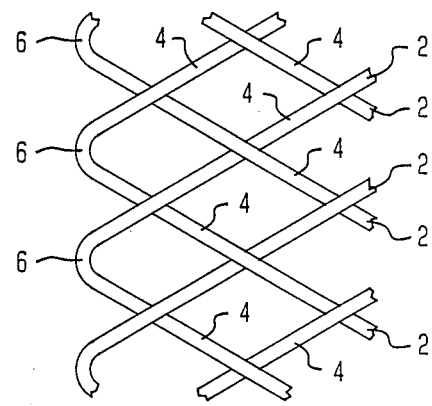

The preferred embodiment of the invention uses a component shown in FIGS. 1A-1C which is straight and has a plurality of elongated and continuous electrically resistive elements 2. Elements 2 are braided together in this example, and are identical and made of wire. The wire preferably has an outer shell of copper which may be about one mil thick surrounding a core which is three mils in diameter and made of stainless steel Alloy 17-7 PH, but there may be no shell, and other materials and dimensions can be used. The core provides strain-resistance; the shell reduces electrical resistance to a useful value. Since elements 2 are preferably wire, they will be referred to as "wires", even though they need neither be of metal nor of a circular cross-section. Preferably, the component contains between thirteen and one hundred and one wires 2. A typical number of wires 2 is forty-nine, and a typical width for the component is approximately one inch. For the purposes of clarity, only twelve wires are shown in FIG. 1A.

Wires 2 are normally all identical. In particular, each wire 2 traverses an alternating zigzag path which has both straight portions 4 and curved portions 6. (It will be understood that straight portions 4 may deviate from absolute linearity.) Each two adjacent straight portions 4 are connected together by a corresponding curved portion 6 to form the zigzag. In the preferred embodiment, the zigzag path is even, the straight portions 4 are substantially identical, and the sides 8 of the component are parallel. Alternatively, the zigzag may be uneven, i.e., the straight portions 4 may be of different lengths or the sides 8 may be non-parallel, or both. The component is elongated along an axis 10, and the straight portions 4 extend between the sides 8 of the component.

The straight portions 4 intersect a central axis 10 which is midway between sides 8 and preferably is parallel to them. Straight portions 4 form alternate interior angles 12 with central axis 10, and in the preferred embodiment alternate interior angles 12 are preferably between 10° and 80° and most advantageously approximately 60°.

The electrical heater is thus designed to take its intended use into account. Since the helicopter rotor blade experiences maximum strain along its longitudinal axis and essentially no strain at angles of approximately 60° to it, the component is designed such that its constituent wires 2 are essentially unstrained when the electrical heater is attached to (or embedded in) a helicopter rotor blade, with the longitudinal axis of the blade parallel to the axis 10 of the electrical heater. Wires 2 therefore do not break. The reason why alternate interior angles 12 can deviate from 60° is that the wires 2 can withstand some cyclic strain without breaking. As the strain-resistance of wires 2 of varying materials increases, the permissible deviation of alternate interior angles 12 from 60° also increases for any given strain. A considerable deviation of interior angles 12 from 60° may therefore be entirely acceptable from the standpoint of strain-resistance. As a practical matter, wires 2 and their orientation are chosen to provide a large margin of safety.

The curved portions 6 are all smooth curves, and preferably are circular arcs which have radii of curvature between 1/64th and ⅜ths inch, although they need not be truly circular. All of the wires 2 are electrically and mechanically connected (e.g. by soldering or welding) to connection bars 4 at the respective ends of the component. Connection bars 14 are connected to lead wires 16, which permit the component to be energized by an outside power source (not shown), or may themselves bridge between adjacent components, thereby connecting them in series.

Typically, a component one inch wide of the type described above will have a linear resistance of between one-tenth and ten ohms per foot, depending on the applied voltage and the length of the heated section. The braid component may be made as long as required, but will typically be about twenty feet long if intended for use on the rotor blade of a medium-sized helicopter.

At each point on the component where two wires touch, the wires are equally long, i.e. the lengths of the wires from that point to a connector bar are the same. As a result, the wires will be at the same potential wherever they cross and no current will flow between them. Since this is true over the entire component, it is unnecessary to insulate the wires 2 from each other.

The component described above can be supported on a support that is attached to (or is integral with) a helicopter rotor blade or other structure. The purpose of the support is to prevent the component from becoming strained during handling, although it happens to have other advantages, i.e. it facilitates attachment of the component to an existing structure. In FIG. 2, the support 18 is an elastomeric envelope which can be manufactured of any substance having appropriate mechanical qualities and the requisite dielectric and thermal characteristics. This embodiment 5 has the advantage that strain occurring in the helicopter rotor blade (and thus acting on the blade heater) can be somewhat isolated from the component, increasing strain-resistance still further. However, this embodiment has the disadvantage that it is necessary to protect the envelope from damage by using an overlying layer of some protective substance.

Figure 3:
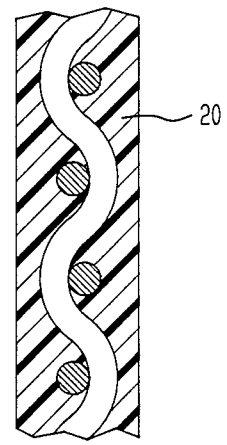
FIG. 3 shows a diagonal sectional view of another embodiment of the invention which uses a relatively rigid base to prevent deformation of the component.

Alternatively, the support may be relatively rigid, as in the case of the epoxy base 20 shown in FIG. 3. The epoxy base 20 may be reinforced with glass fiber. Preferably, the component is completely embedded in the reinforced epoxy. Furthermore, the epoxy base 20 may be integral with the helicopter rotor blade or other part to be heated, i.e. the component may be a part of a blade rather than being secured to the blade.

Thus, in the preferred embodiment, axis 10 is aligned parallel to the axis of a helicopter rotor blade, and alternate interior angles 12 are chosen to correspond with directions in which excessive strain is not expected. The design of the preferred embodiment has proved to include a large margin of safety, so that absolute parallelism between axis 10 and the longitudinal axis of the helicopter rotor blade is not necessary. In fact, whether the electrical heater is a part of the helicopter rotor blade or is only attached to it, the electrical heater may outlast the blade and be used until the blade is discarded at the end of its service life.

Figure 6:
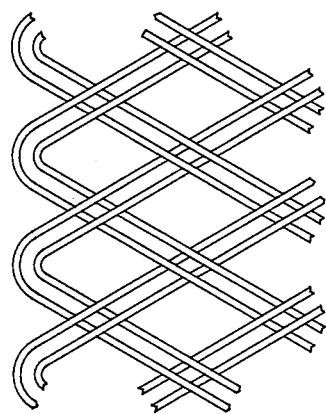
FIG. 6 is a view similar to FIG. 1C of another component in accordance with the invention.

With reference to FIG. 6, it can be seen that pairs of wires can be braided just as single wires can be braided. This so-called "two-over-two" braiding increases the stiffness of the finished braided component and increases the heat output per unit area assuming the wire used is the same.

Persons skilled in the art will appreciate that a normal de-iced helicopter blade will carry a plurality of parallel spanwise heaters which are energized in sequence to make ice peel off progressively chordwise from the leading edge. Alternatively, the heater can be made in full-chord sections, which are energized in spanwise sequence for spanwise shedding.

The heaters may be mounted in a common blanket, may be individually placed in parallel channels cut into the blade, may be molded directly in the blade itself, or may be otherwise suitably affixed. Another possibility is to place epoxy prepreg on both sides of a component to form a strip, to lay the strip in a groove in the blade, to force the strip tightly against the blade, and to cure the strip in place by turning the heater on. However, the methods by which the heater and blade are joined or formed together are not part of the invention.

The invention is not limited to use with helicopter rotor blades, but can be used with any body to which force is applied primarily in one direction.

The examples illustrated use a braided component because this is a convenient way of keeping the wires 2 oriented properly, i.e. oriented such that the strain to which they are exposed is not excessive considering their strain-resistance. However, it is not necessary that the component be braided. Furthermore, the preferred embodiment illustrated delivers a constant heat output per square inch of heated area because the spacing between wires does not change. If the alternate interior angles 12 change progressively from one end of the component to the other—i.e. if the component is "loose" at one end and "tight" at the other—the heat output per square inch will be lower at the "loose" end and higher at the "tight" one. In the following description of the preferred method, it will be assumed that the component is to be braided and that it is to have a uniform pattern.

The preferred method of making the electrical heater involves the use of a flat braiding machine such as is already known and manufactured by, e.g. New England Butt Company, 304 Pearl Street, Providence, R.I. Such machines can be used to produce the braid component shown in FIGS. 1A–1C in one continuous strip. It will be understood that the flat braiding machine need not be made by this manufacturer and that it also need not be designed to work as a flat braiding machine, since it is possible to make a round braiding machine operate as a flat braiding machine by using suitable gears and quoits to stop the round braiding machine off.

Figure 4:
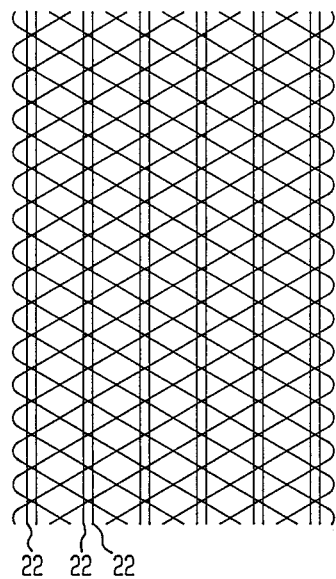
FIG. 4 shows an intermediate stage of manufacture for the component shown in FIGS. 1A–1C in a schematic fashion.
Figure 5:
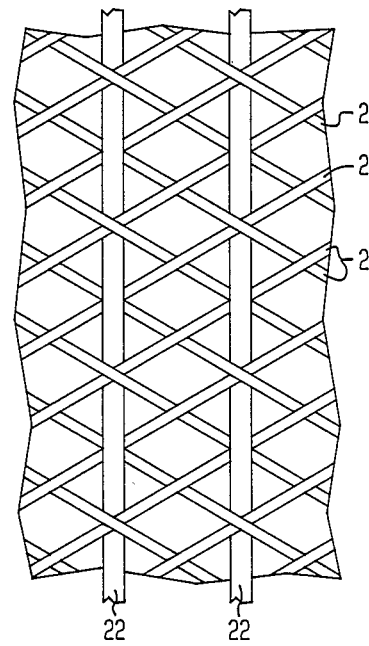
FIG. 5 is an enlarged detail view of a portion of FIG. 4.
Figure 7:
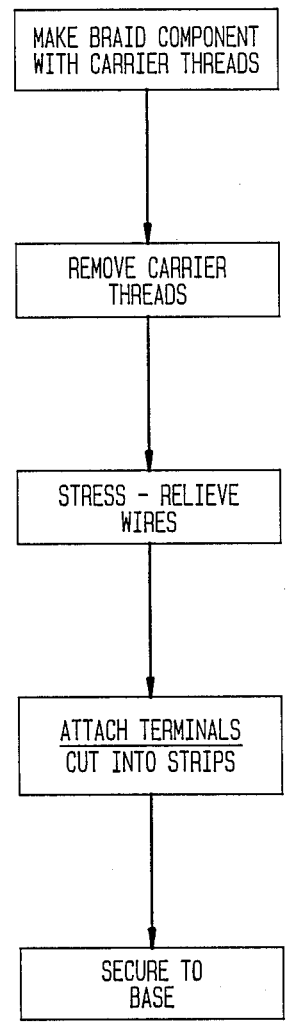
FIG. 7 is a flow chart showing the sequence of a preferred method in accordance with the invention.

The flat braiding machine has at least one hollow warp stud. This permits at least one warp thread to be drawn off with the material braided, which in this case is wire. The flat braided component from the machine is held in its desired shape by carrier threads which are warp threads introduced into the component during braiding. This prevents the component from deforming as it is drawn off the machine. Typically, there will be between ten and twenty-four such carrier threads, which are shown in FIGS. 4 and 5 by reference numerals 22.

The carrier threads may interfere with subsequent manufacturing steps or proper support of the component by the base. Therefore, the carrier threads should preferably be removed, although this need not be the case. In this example, the carrier threads are made of polyvinyl alcohol. This has been found to be strong enough to support the component while being easily soluble in hot water of perhaps 180° F. This has the advantage that no special reagent is necessary to remove the carrier threads and the wire remains unaffected. However, the carrier threads may be made of other substances and other materials can be used to remove them.

Ideally, the component is internally stress-relieved after removal of the carrier threads, although this step is optional. If wires 2 include a core of stainless steel Alloy 17-7 PH for example, the wire can be heat-treated or annealed at between 1,000° F. degrees and 1,050° F. for between 15 and 30 minutes in, e.g., an inert atmosphere. This has the effect of increasing the fatigue resistance of wires 2 by stress-relieving the wires 2 at curved portions 6. Because curved portions 6 are stressed during braiding and do not lie entirely along directions in which strain is expected to be minimal, the component can be expected to break at a curved portion 6 if breakage occurs at all. Stress-relieving wires 2 makes it less likely for a wire 2 to break at sides 8.

In this example, after the component has been braided, the carrier threads have been removed and the component stress-relieved, it is necessary to cut the braid component into straight strips of the desired length and to affix terminals to the ends of the cut off strips. This can take place by soldering the connection bars 14 to the braid component and cutting the component apart between connection bars. Leads can then be connected to the connection bars. The precise ways in which strips are cut off and terminals attached and the order in which these steps are performed are not part of the invention.

After terminals have been affixed to the component, the assembly is affixed to a base. This may take place by dipping the assembly into an appropriate elastomer or epoxy, laminating it with an appropriate elastomer or epoxy, or otherwise mounting it to or securing it on a base. The base should be an electric insulator. Alternatively, the base may be an electrical conductor, if each of the wires is individually insulated. Ideally, the base will completely surround the component and connection bars so as to protect and insulate them, and will be strong and resistant to abrasion while being thermally conductive, but in practice the heater may be covered with a protective sheet of, e.g., polyurethane, titanium, aluminum, or other substance.

What is claimed is:

1. A strain-resistant heated helicopter rotor blade, comprising:
    an elongated blade body having a longitudinal axis along which cyclic stress is applied during use;
    an elongated electrical heater mounted to the body parallel to said axis and comprising a plurality of like, elongated and electrically resistive wires which are placed together to form a component with two opposed ends, two parallel sides and a central axis, each of said plurality of wires being oriented to substantially lie along directions of minimum strain in the blade body when the body is stressed along said longitudinal axis, said directions of minimum strain being determined by the Poisson's ratio of the blade body at the location of the heater and selected in accordance therewith; and
    electrical terminals connected to said ends.

2. The blade of claim 1, wherein the wires are embedded in said blade body.

3. The blade of claim 1, wherein the wires and terminals are embedded in said blade body.

4. The blade of claim 1, wherein the wires are of copper-clad stainless steel.

* * * * *